(12) United States Patent
Simmons et al.

(10) Patent No.: US 11,059,425 B2
(45) Date of Patent: Jul. 13, 2021

(54) VEHICLE FLOOR ASSEMBLY

(71) Applicant: JAGUAR LAND ROVER LIMITED, Warwickshire (GB)

(72) Inventors: Edward Simmons, Coventry (GB); Christopher Bellamy, Coventry (GB); Kripa Balachandran, Coventry (GB); James Pickup, Coventry (GB); Daniel Tait, Coventry (GB); Ben Cook, Coventry (GB); Emily Greenhalgh, Coventry (GB); Paul Kellitt, Coventry (GB); Christopher Brown, Coventry (GB); Matthew Atkinson, Coventry (GB); Thomas Booker, Coventry (GB); Lucy Wakefield, Coventry (GB); David Warburton, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 78 days.

(21) Appl. No.: 16/207,716

(22) Filed: Dec. 3, 2018

(65) Prior Publication Data

US 2019/0176711 A1 Jun. 13, 2019

(30) Foreign Application Priority Data

Dec. 7, 2017 (GB) ..................................... 1720392

(51) Int. Cl.
*B60R 7/04* (2006.01)
*B60N 2/20* (2006.01)
*B60R 5/04* (2006.01)

(52) U.S. Cl.
CPC ................ *B60R 7/04* (2013.01); *B60N 2/206* (2013.01); *B60R 5/04* (2013.01)

(58) Field of Classification Search
CPC .............. B60R 7/04; B60R 5/04; B60N 2/206
See application file for complete search history.

(56) References Cited

U.S. PATENT DOCUMENTS 4,479,675 A 10/1984 Zankl

FOREIGN PATENT DOCUMENTS

DE 2635506 A1 3/1977
DE 3203940 A1 8/1983
(Continued)

OTHER PUBLICATIONS

Combined Search and Examination Report under Sections 17 and 18(3) for Application No. GB 1720392.8 dated Jun. 5, 2018.
(Continued)

*Primary Examiner* — D Glenn Dayoan
*Assistant Examiner* — Melissa Ann Bonifazi
(74) *Attorney, Agent, or Firm* — Carlson, Gaskey & Olds

(57) ABSTRACT

The present disclosure relates to a floor assembly for a vehicle load space. The floor assembly includes a floor panel that is configurable in a lowered position, a first raised position and a second raised position. The floor assembly includes a first pivot means defining a first pivot axis about which the floor panel pivots from the lowered position to the first raised position. The floor assembly includes a second pivot means defining a second pivot axis about which the floor panel pivots from the lowered position to said second raised position. The floor panel can perform different functions in the first and second raised positions. The present disclosure also relates to a vehicle having a floor assembly. The floor assembly may be provided in the floor of the vehicle load space.

20 Claims, 18 Drawing Sheets

(56) References Cited

FOREIGN PATENT DOCUMENTS

| | | |
|---|---|---|
| DE | 202004013236 U1 | 10/2004 |
| EP | 2 048 031 A1 | 4/2009 |
| FR | 2870495 A1 | 11/2005 |
| GB | 1 522 749 | 7/1976 |
| JP | 2008-68712 | 3/2008 |
| JP | 2009-161034 | 7/2009 |

OTHER PUBLICATIONS

Search Report for DE Application No. 10 2018 220 816.6 dated Jan. 2, 2020.

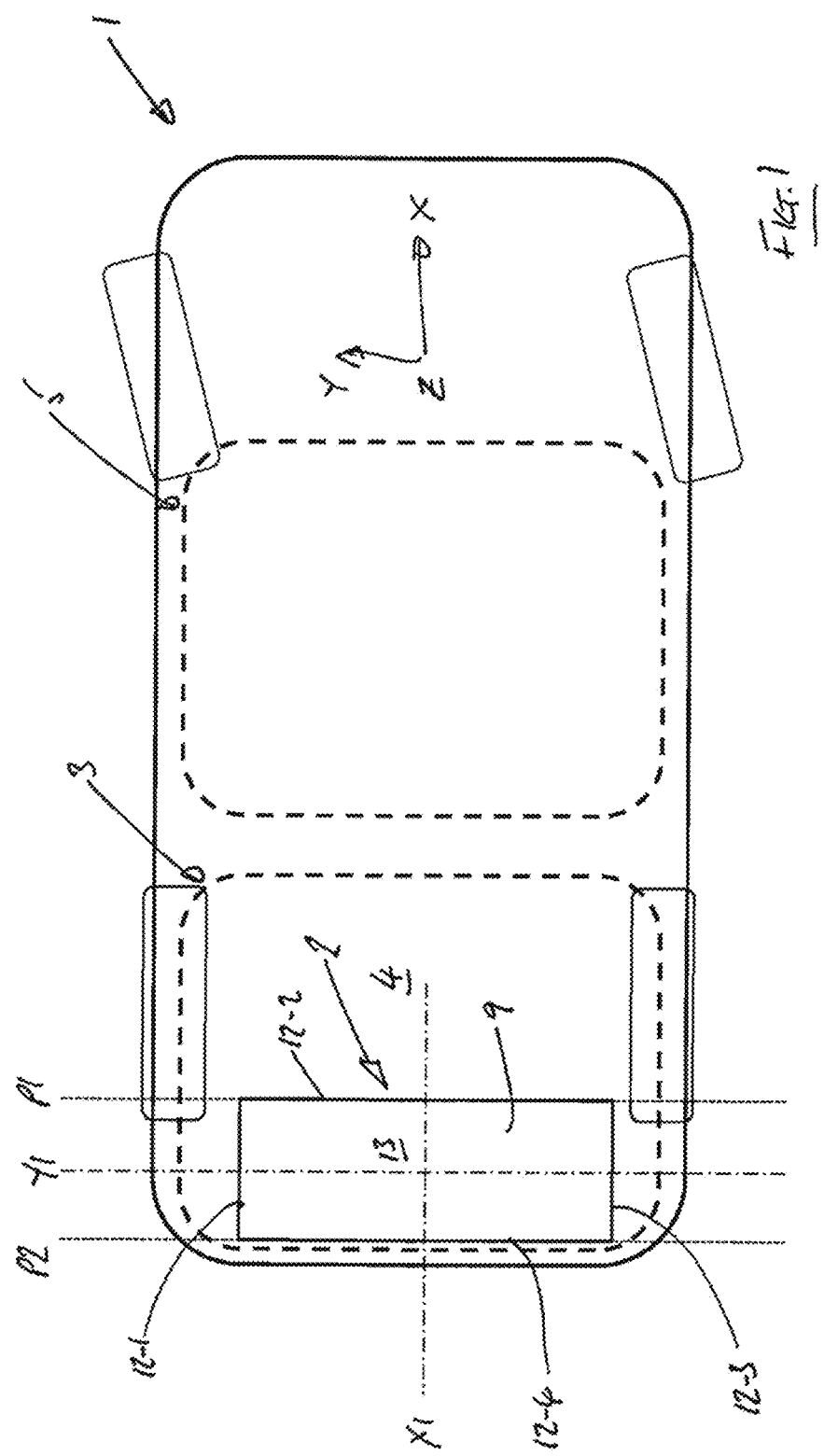

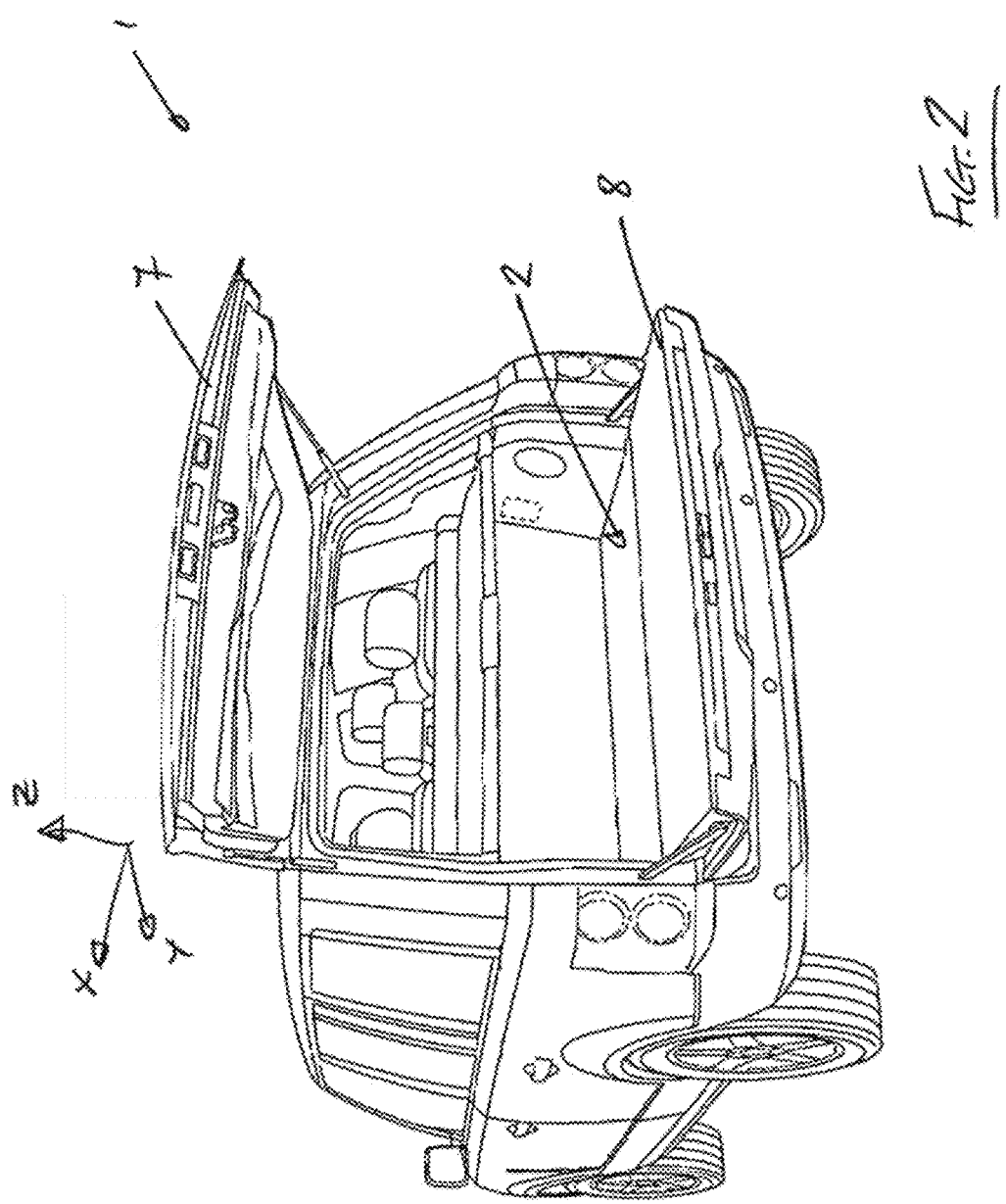

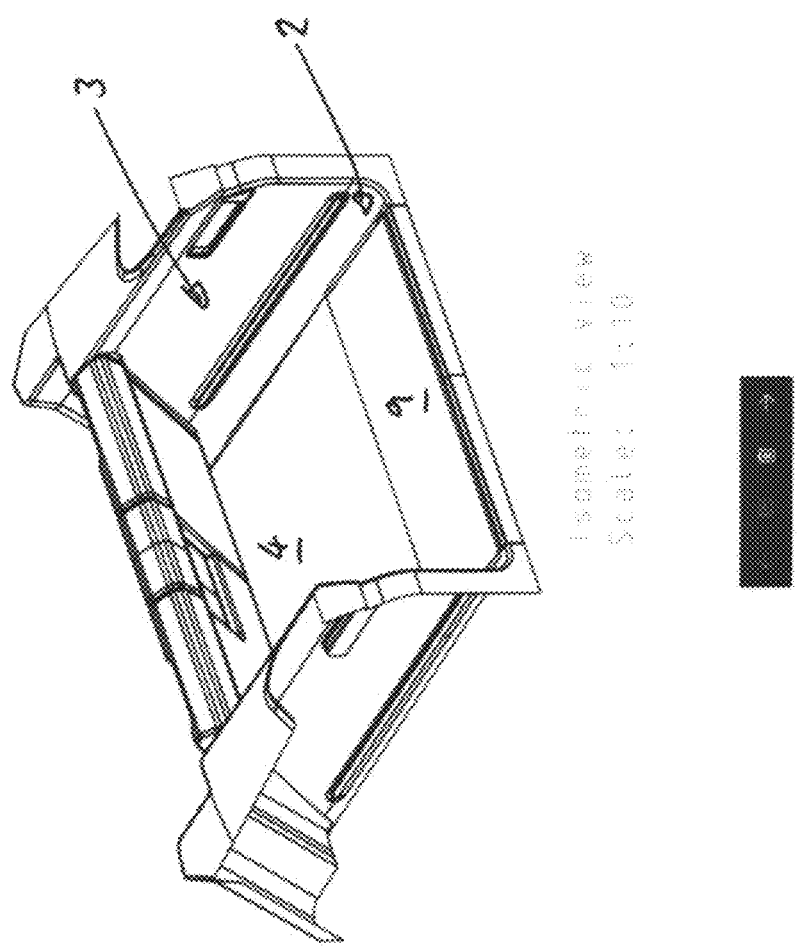

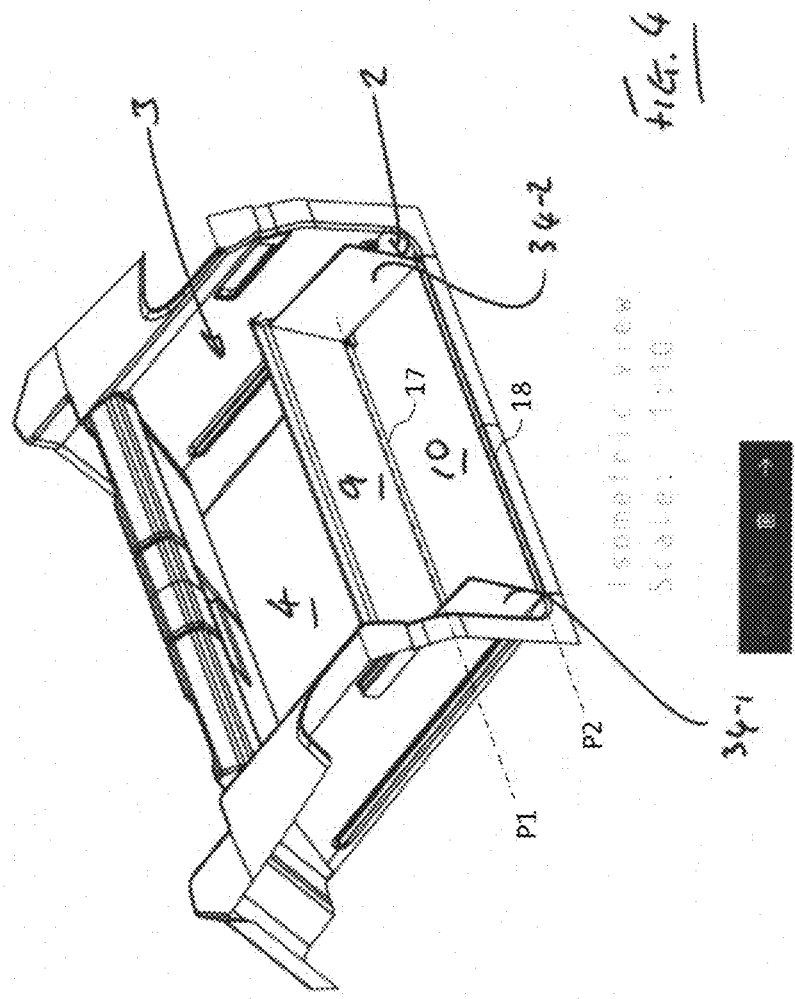

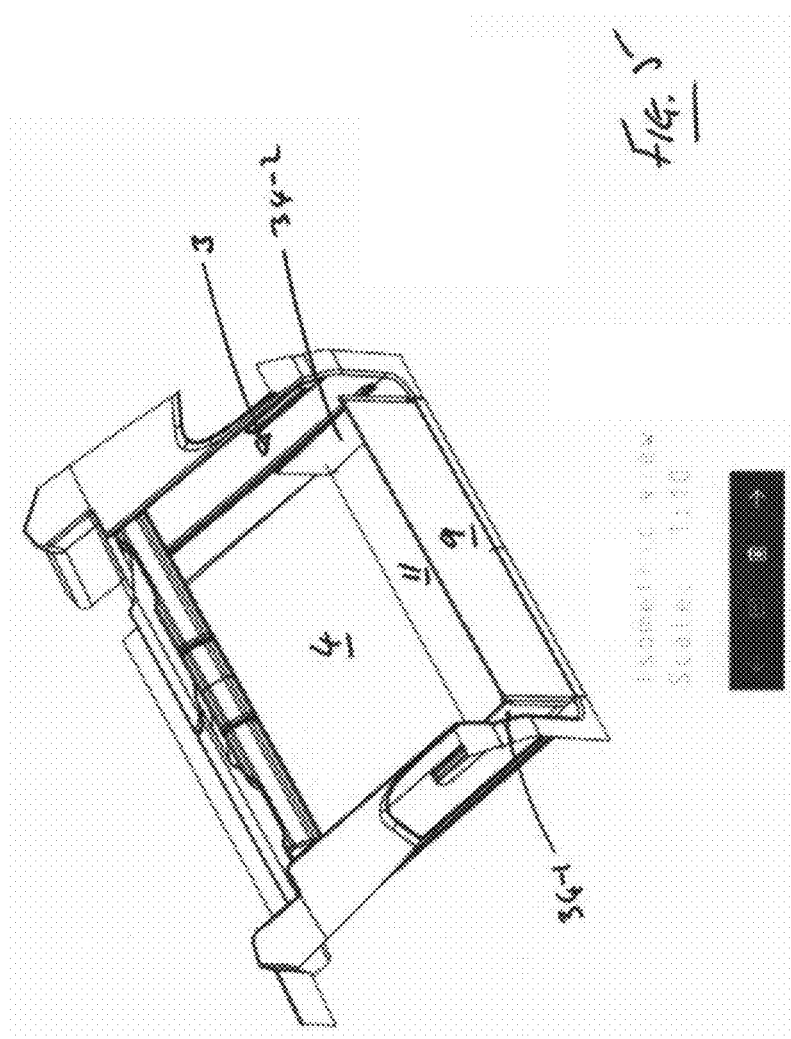

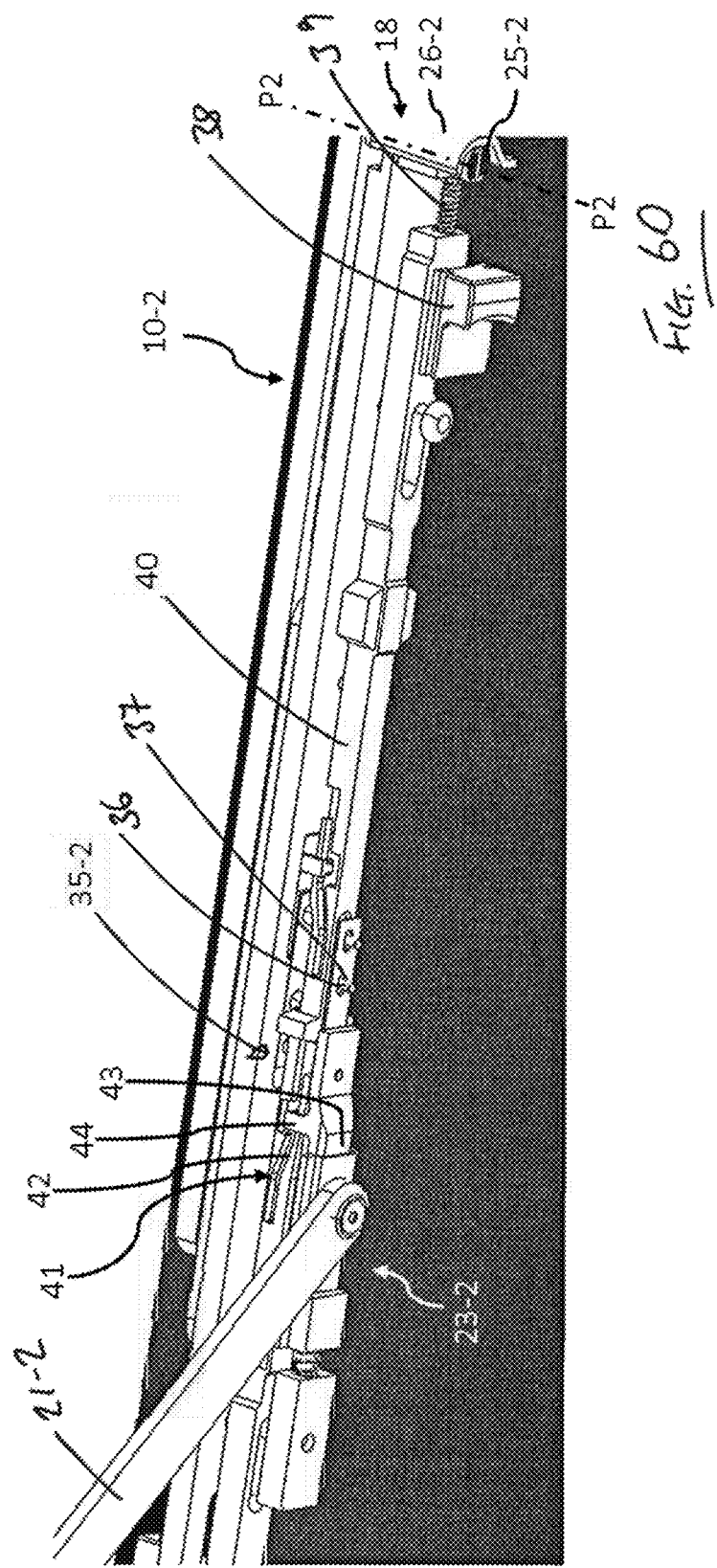

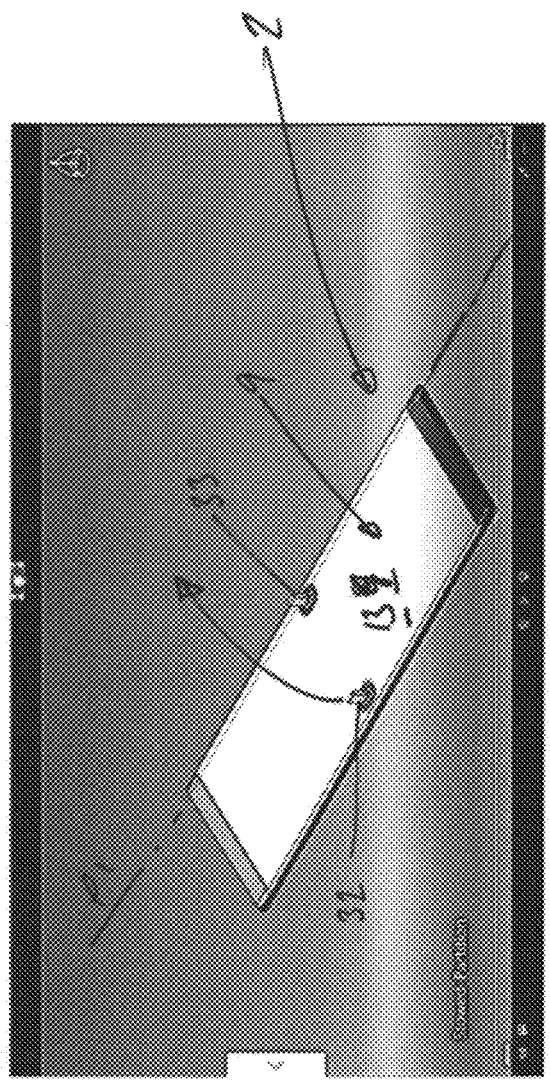

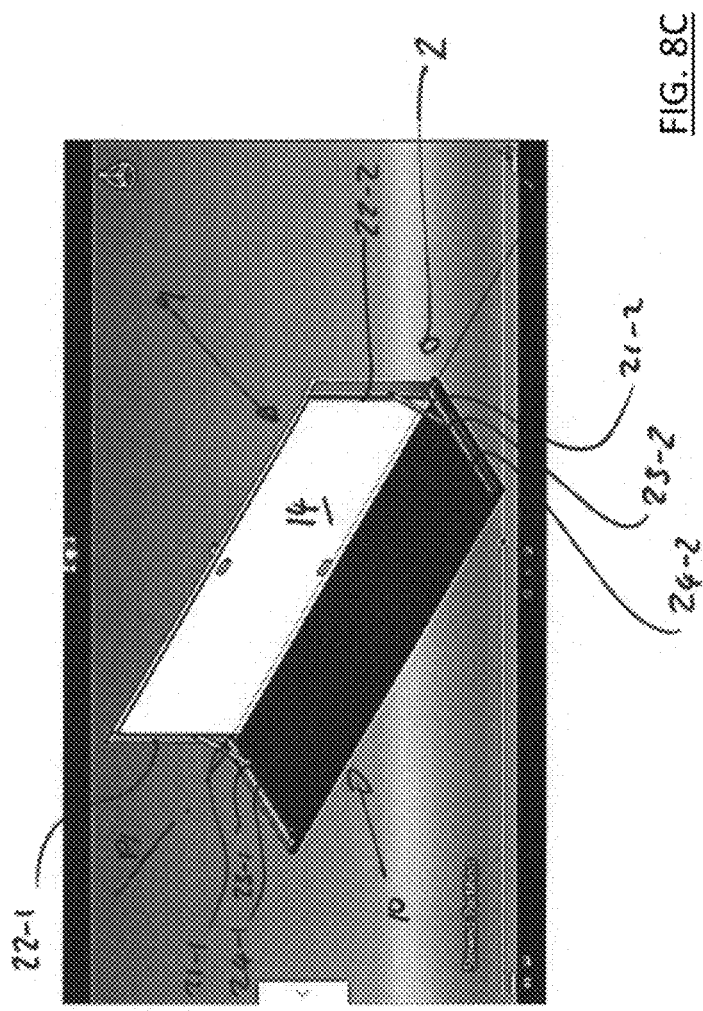

VEHICLE FLOOR ASSEMBLY

CROSS REFERENCE TO RELATED APPLICATIONS

This application claims priority to United Kingdom Patent Application No. GB 1720392.8 filed on 7 Dec. 2018.

TECHNICAL FIELD

The present disclosure relates to a vehicle floor assembly. More particularly, but not exclusively, the present disclosure relates to a floor assembly for a vehicle load space. The present disclosure also relates to a vehicle incorporating a floor assembly.

BACKGROUND

Vehicles, such as sports utility vehicles (SUV), may be provided with a tailgate which opens to provide access to a load space. The tailgate may be a split tailgate comprising an upper tailgate which is top-hinged; and a lower tailgate which is bottom-hinged. When the lower tailgate is open, it may be difficult to reach the front of the load space (i.e. the region closest to the front of the vehicle). This may make it difficult for a user to retrieve items from the load space, for example if they have moved within the load space. It is also known to sit at the rear of the load space, for example using the lower tailgate as a temporary or occasional seat. However, this may prove uncomfortable over extended periods as there is no backrest.

It is against this backdrop that the present invention has been conceived. At least in certain embodiments, the present invention seeks to overcome or ameliorate at least some of the problems associated with prior art arrangements.

SUMMARY OF THE INVENTION

Aspects of the present invention relate to a floor assembly and to a vehicle as claimed in the appended claims.

According to an aspect of the present invention there is provided a floor assembly for a vehicle load space, the floor assembly comprising:

a floor panel configurable in a lowered position, a first raised position and a second raised position;

first pivot means defining a first pivot axis about which the floor panel pivots from the lowered position to said first raised position; and second pivot means defining a second pivot axis about which the floor panel pivots from the lowered position to said second raised position.

According to a further aspect of the present invention there is provided a floor assembly for a vehicle load space, the floor assembly comprising:

a floor panel configurable in a lowered position, a first raised position and a second raised position;

a first pivot defining a first pivot axis about which the floor panel pivots from the lowered position to said first raised position;

a second pivot defining a second pivot axis about which the floor panel pivots from the lowered position to said second raised position; and a retaining mechanism for retaining the floor panel in at least one of the first raised position and the second raised position.

The retaining mechanism may be configured to retain the floor panel in at least one of:

one or more intermediate positions between the lowered position and the first raised position; and one or more intermediate positions between the lowered position and the second raised position.

The floor panel may be pivoted from the lowered position to either the first raised position or the second raised position. The floor panel can perform different functions in said first and second raised positions. For example, the floor panel may selectively be configured as a load space partition and a backstop. The floor panel may be used selectively into the first position to partition or sub-divide the load space; and into the second position to function as a backstop for the load space to prevent items rolling out, or as a backrest for a person sitting at the rear of the load space or on a tailgate. When in the lowered position, the floor panel may form a continuation of the floor of the load space.

The first pivot may comprise a first pivoting coupling. The first pivoting coupling may comprise one or more pivot pins. The second pivot may comprise a second pivoting coupling. The second pivoting coupling may comprise one or more pivot pins.

The floor panel may be arranged to pivot about said first pivot axis in a first direction; and to pivot about the second pivot axis in a second direction. The first and second directions may be opposite to each other. For example, when installed in a vehicle, the first direction may be towards a front of the vehicle; and the second direction may be towards a rear of the vehicle. The pivoting directions may be reversed in certain applications.

The first and second pivot axes may be arranged substantially parallel to each other. The floor panel may comprise a plurality of sides. The first and second pivot axes may be disposed along opposing sides of the floor panel. The floor panel may comprise a rectangular panel having a major central axis and a minor central axis. The major central axis passes through the center of the shorter sides of the rectangular panel; and the minor central axis passes through the center of the longer sides of the rectangular panel. The first and second pivot axes may extend substantially parallel to said major central axis.

The floor assembly may comprise a coupling mechanism. The first pivot may be configured to pivotably mount the floor panel to said coupling mechanism. In use, the floor panel may be pivotable relative to said coupling mechanism about said first pivot axis.

The coupling mechanism may take the form of a support structure. For example, the support structure may take the form of a single continuous panel, side members adapted to support the floor panel, a support frame, a panel or any other suitable support structure.

The floor assembly may comprise at least one floor panel strut for supporting the floor panel. The at least one floor panel strut may be arranged to extend between the floor panel and the coupling mechanism. Each floor panel strut has a first end and a second end. One of said first and second ends may be pivotally connected to the floor panel or the coupling mechanism; and the other of said first and second ends may be movably mounted to the other of said floor panel and coupling mechanism. A movable coupling may be provided to movably couple the floor panel strut to the floor panel or the coupling mechanism. The movable coupling may comprise a guide track and a carriage.

The floor assembly may comprise a first retaining mechanism for retaining the floor panel in said first raised position. The first retaining mechanism may be configured to engage the at least one floor panel strut.

The floor assembly may comprise a first locking mechanism for locking the floor panel. The first locking mechanism may be configured to lock the floor panel in one or more intermediate position between said lowered position and said first raised position. Alternatively, or in addition, the first locking mechanism may be operable to lock the floor panel in said first raised position. The first locking mechanism may be configured to lock said floor panel strut. For example, the second locking mechanism may be configured to lock the carriage in said guide track.

The second pivot may be configured to pivotably mount the coupling mechanism. The second pivot, may for example, pivotably mount the coupling mechanism to a floor of the vehicle load space. The floor panel and the coupling mechanism may pivot together about said second pivot axis. The coupling mechanism may be configured to reinforce the floor panel when they pivot together.

The floor assembly may comprise at least one coupling mechanism strut for supporting the coupling mechanism. The at least one coupling mechanism strut may be arranged to extend between the coupling mechanism and a base. Each coupling mechanism strut has a first end and a second end. One of said first and second ends may be pivotally connected to the coupling mechanism or the base; and the other of said first and second ends may be movably mounted to the other of said coupling mechanism and base. A movable coupling may be provided to movably couple the coupling mechanism strut to the coupling mechanism or the base. The movable coupling may comprise a guide track and a carriage.

The floor assembly may comprise a second retaining mechanism for retaining the floor panel in said second raised position. The second retaining mechanism may be configured to engage the at least one coupling mechanism strut.

The floor assembly may comprise a second locking mechanism for locking the coupling mechanism. The second locking mechanism may be configured to lock the coupling mechanism such that the floor panel is disposed in one or more intermediate position between said lowered position and said second raised position. The second locking mechanism may be arranged to lock the coupling mechanism in one or more predefined angular position or may be continuously variable. Alternatively, or in addition, the second locking mechanism may be operable to lock the coupling mechanism such that the floor panel is disposed in said second raised position. The second locking mechanism may be configured to lock said coupling mechanism strut. For example, the second locking mechanism may be configured to lock the carriage in said guide track.

The floor assembly may comprise a base for mounting to a floor of the vehicle load space. The base may comprise a recess for receiving said coupling mechanism. The base may comprise a lower wall, and sidewalls. The base may form a tray in which the floor panel and/or the coupling mechanism is received. In certain embodiments, the floor panel and the coupling mechanism may be stowed in the base without impinging on the usable load space volume.

The floor assembly may comprise a retention mechanism arranged to prevent the side of the floor panel along which the first pivot axis is disposed from lifting away from the base when the floor panel is in the first raised position. The retention mechanism may comprise a clip mounted to the base for releasably engaging a cooperating feature mounted on a pivot pin. The clip may comprise a pair of arms for releasably engaging the cooperating feature when the floor panel is in the first raised position. The clip and cooperating feature may be further arranged such that, when the floor panel is in the lowered position, the cooperation feature is disengageable from the clip. In this manner, the clip and cooperating feature may be arranged to permit the side of the floor panel along which the first pivot axis is disposed to lift away from the base when the floor panel is moved from the lowered position to the second raised position.

The arms of the clip may define a receiving feature open at each end to allow the pivot pin to pass there through and capable of receiving therein the cooperating feature such that as the floor panel pivots about the first pivot axis between the lowered position and the first raised position, the cooperating feature is able to rotate within the receiving feature formed by the arms of the clip. A gap may be provided between the arms of the clip such an opening is provided at the top of the receiving feature. The cooperating feature may comprise a cross-section profile (e.g. an oval profile) configured to be able to pass through the opening provided at the top of the receiving feature when the floor panel is in the lowered position, but which cross-section profile is too large to pass through the opening provided at the top of the receiving feature when the floor panel is in the first raised position.

One of said first and second raised positions may be a load space partitioning position. The other of said first and second raised positions may be a backstop position.

The floor assembly may comprise at least one padded member for the floor panel. The at least one padded member may be permanently or removably attached to the floor panel.

The first pivot may comprise at least one first pivot pin. The second pivot may comprise at least one second pivot pin.

The floor assembly may be manually operated to pivot the floor panel between said lowered position, said first raised position and/or said second raised position. Alternatively, one or more actuator may be provided to pivot the floor panel between said lowered position, said first raised position and/or said second raised position. The one or more actuator may, for example, comprise an electromechanical actuator.

The floor assembly may comprise first and second side supports. The first and second side supports may be suitable for positioning in an upright configuration at respective ends of the floor panel when the floor panel is in said first raised position and/or said second raised position. The first and second side supports may be used in conjunction with, or instead of the first and second floor panel struts and/or the first and second coupling mechanism struts.

According to a further aspect of the present invention there is provided a vehicle comprising a floor assembly as described herein.

The floor assembly may be disposed in a load space of the vehicle. The floor assembly may be configured such that the floor panel forms a continuation of a floor of the load space when in said lowered position.

The floor assembly may be configured such that said first and second pivot axes extend in a transverse direction.

The floor panel may be configured to form a backstop for the load space or a backrest for one or more person sitting on a floor of the load space or on a tailgate which is opened to provide access to the load space.

In certain embodiments, the floor assembly may be removable from the vehicle. The floor assembly may be configured to form a temporary ramp to facilitate ingress to and/or egress from the load space by an animal, such as a dog. The floor assembly may comprise attachment means for attaching one end of the floor assembly to the vehicle.

According to a further aspect of the invention there is provided a floor assembly for a vehicle load space, the floor assembly comprising: a floor panel configurable in a lowered position, a first raised position and a second raised position; a base for mounting the floor assembly to a floor of the vehicle load space; a first pivot axis about which the floor panel pivots relative to the base from the lowered position to said first raised position; a second pivot axis about which the floor panel pivots relative to the base from the lowered position to said second raised position; and a locking arrangement for retaining the floor panel in at least one of the first raised position and the second raised position.

Optionally, the floor assembly further comprises a support structure; wherein the floor panel is pivotally coupled to the support structure, the coupling between the floor panel and the support structure defining the first pivot axis; and wherein the support structure is pivotally coupled to the base, the coupling between the support structure and the base defining the second pivot axis.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIG. 1 is a schematic plan view of a vehicle incorporating a floor assembly in accordance with an embodiment of the present invention;

FIG. 2 is a schematic side elevation of the vehicle shown in FIG. 1;

FIG. 3 is a perspective view of the load space of the vehicle showing the floor assembly in a lowered position;

FIG. 4 is a perspective view of the load space of the vehicle showing the floor assembly in a first raised position to form a load space partition;

FIG. 5 is a perspective view of the load space of the vehicle showing the floor assembly in a second raised position to form a backstop or backrest;

FIGS. 6A, 6B, 6C and 6D are perspective views of the first pivoting coupling for pivoting the floor panel from the lowered position to the first raised position;

FIGS. 8A, 8B and 8C are perspective views showing the floor panel opening from the lowered position to the first raised position;

DETAILED DESCRIPTION

Figure 6A:
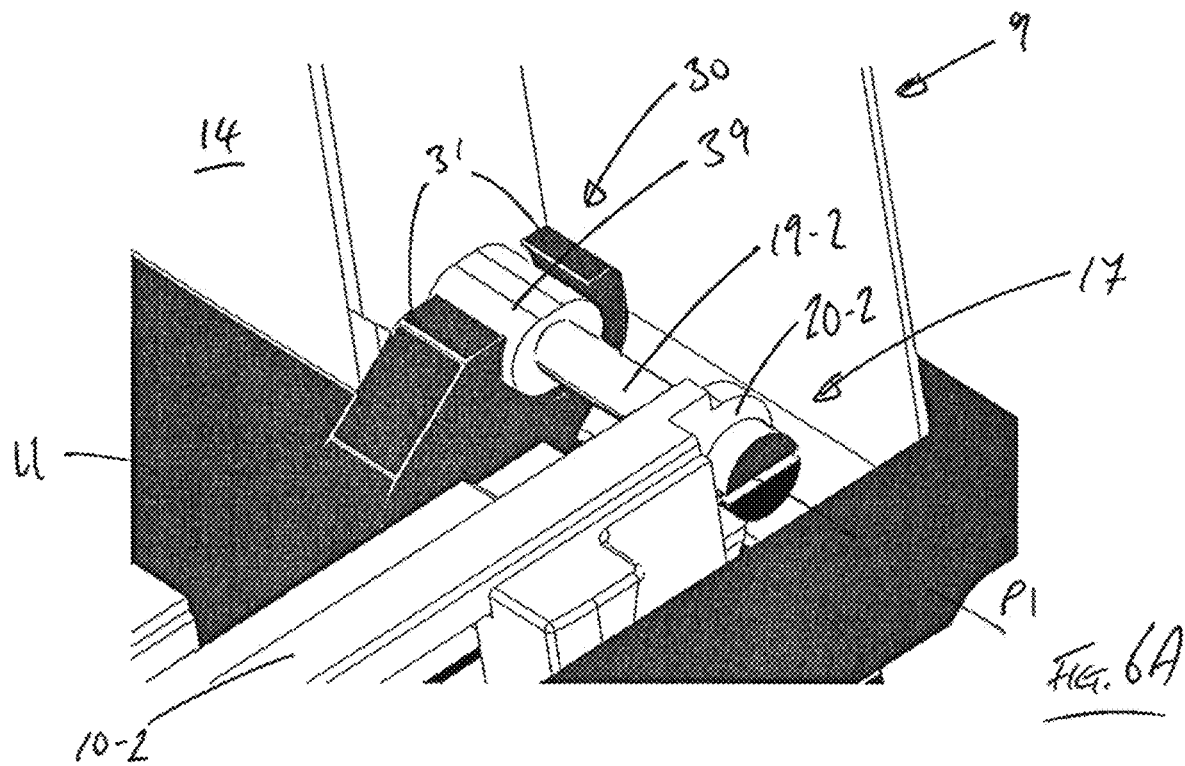

A vehicle 1 comprising a floor assembly 2 in accordance with an aspect of the present invention will now be described with reference to the accompanying figures. The vehicle 1 in the present embodiment is a sports utility vehicle (SUV), but the floor assembly 2 may be installed in other types of vehicle, such as a station-wagon or estate body style. The vehicle 1 is described herein with reference to a reference frame comprising a longitudinal axis X, a transverse axis Y and a vertical axis Z.

As shown in FIGS. 1 and 2, the floor assembly 2 is provided in a load space 3 of the vehicle 1. In particular, the floor assembly 2 is mounted in a floor 4 of the load space 3. The load space 3 is provided at the rear of the vehicle 1 behind an occupant cabin 5. The load space 3 can be accessed via a tailgate which in the present embodiment is a split tailgate comprising upper and lower tailgates 7, 8. The upper tailgate 7 of the tailgate 6 is top-hinged and pivots upwardly to open the load space 3. The lower tailgate 8 of the tailgate 6 is bottom-hinged and pivots downwardly to open the load space 3. When lowered, the lower tailgate 8 may be used as an occasional seat.

Figure 10A:
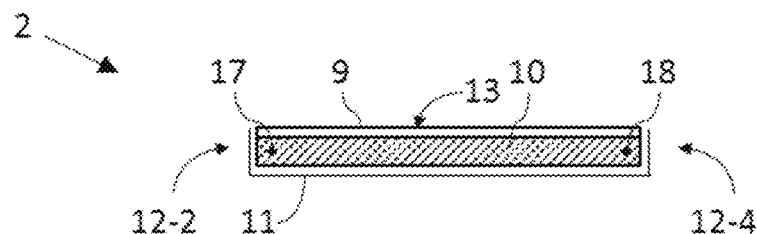
FIG. 10A is a schematic cross-sectional view of the floor assembly in a lowered position.
Figure 10B:
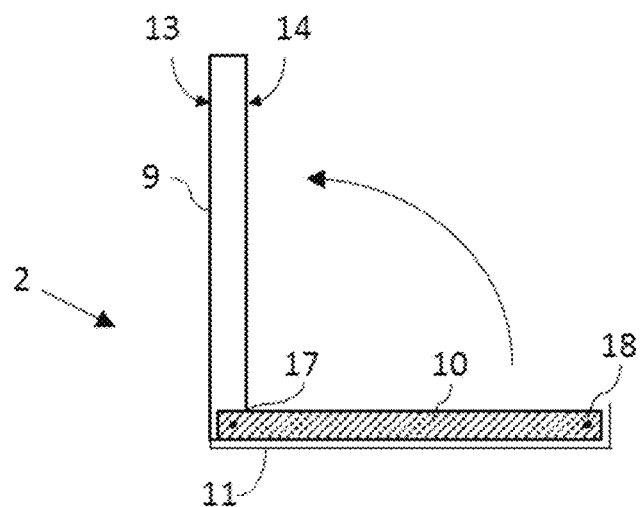
FIG. 10B is a schematic cross-sectional view of the floor assembly in a first raised position.
Figure 10C:
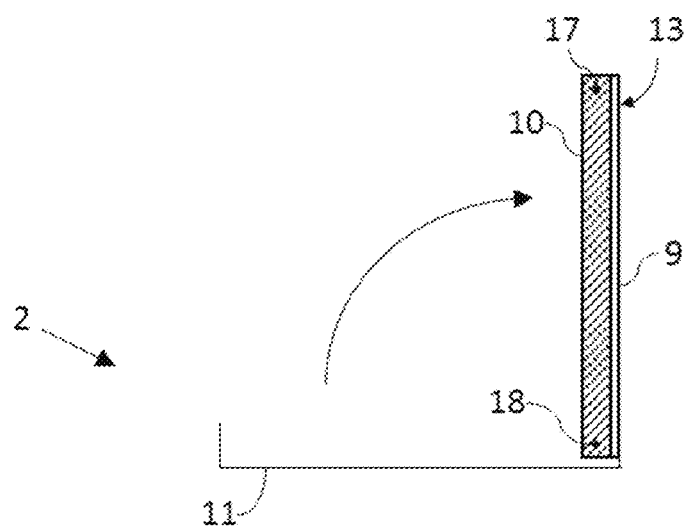
FIG. 10C is a schematic cross-sectional view of the floor assembly in a second raised position.

The floor assembly 2 comprises a floor panel 9 and a base 11. The floor panel 9 is rectangular and comprises a first side 12-1, a second side 12-2, a third side 12-3, a fourth side 12-4, an upper surface 13 and a lower surface 14. The floor panel 9 comprises a major axis Y1 and a minor axis X1. The floor panel 9 is configurable in a lowered position (shown in FIG. 10A); a first raised position (shown in FIG. 10B); and a second raised position (shown in FIG. 10C). When the floor panel 9 is in said lowered position, the second side 12-2 is positioned towards the front of the vehicle 1, and the fourth side 12-4 is positioned towards the rear of the vehicle 1. The upper surface 13 may be trimmed to match the remainder of the floor 4, for example with a durable material, such as carpet. The base 11 comprises a lower wall, a first sidewall, a second sidewall, a third sidewall and a fourth sidewall. The second sidewall is positioned towards the front of the vehicle 1; and the fourth sidewall is positioned towards the rear of the vehicle 1. The base 11 is mounted in the floor 4 of the load space 3 and is configured to receive the floor panel 9 therein. The top of the base 11 is open to enable the floor panel 9 to be raised from said lowered position.

To enable the floor panel 9 to be configured in multiple positions, the floor assembly 2 comprises a first pivot 17 defining a first pivot axis P1 about which the floor panel 9 pivots from the lowered position to the first raised position and a second pivot 18 defining a second pivot axis P2 about which the floor panel 9 pivots from the lowered position to the second raised position.

In the present embodiment, the assembly 2 comprises a coupling mechanism 10 wherein the first pivot 17 is configured to pivotably mount the floor panel 9 to said coupling mechanism 10, and the second pivot 18 is configured to pivotably mount the coupling mechanism 10 to the base 11 such that the floor panel 9 and the coupling mechanism 10 pivot together about said second pivot axis.

FIGS. 3 to 5 illustrate an embodiment of the floor assembly 2 in more detail. The coupling mechanism 10 in the embodiment illustrated in FIGS. 3 to 5 comprises a single continuous panel. In other embodiments, the coupling mechanism 10 may comprise side members adapted to support the floor panel 9 (such as first and second side members 10-1, 10-2 of a further embodiment illustrated in FIGS. 6A to 9C), a support frame, a panel or other support structure.

The floor panel 9 is shown in a lowered position in FIG. 3; in the first raised position in FIG. 4; and in the second raised position in FIG. 5. The floor panel 9 pivots about the first pivot axis P1 between the lowered position and the first raised position. The floor panel 9, along with the coupling mechanism 10, pivots about the second pivot axis P2 between the lowered position and the second raised position. The first and second pivot axes P1, P2 are arranged substantially parallel to the transverse axis Y of the vehicle 1. The first and second pivot axes P1, P2 are disposed proximal to the front and rear of the base 11 respectively. In the lowered position, the floor panel 9 and the coupling mechanism 10 are stowed in the base 11 in a face-to-face arrangement and the upper surface 13 forms a continuation of the floor 4 of the load space 3. In the first raised position, the floor panel 9 is configured to form a temporary partition for sub-dividing the load space 3. The floor panel 9 is disposed in an upright position substantially perpendicular to the floor 4 and extends transversely across the load space 3. In the second raised position, the floor panel 9 is configured to form a backstop for the load space or a backrest for a person sitting on the lower tailgate 8 of the tailgate 6.

Figure 6B:
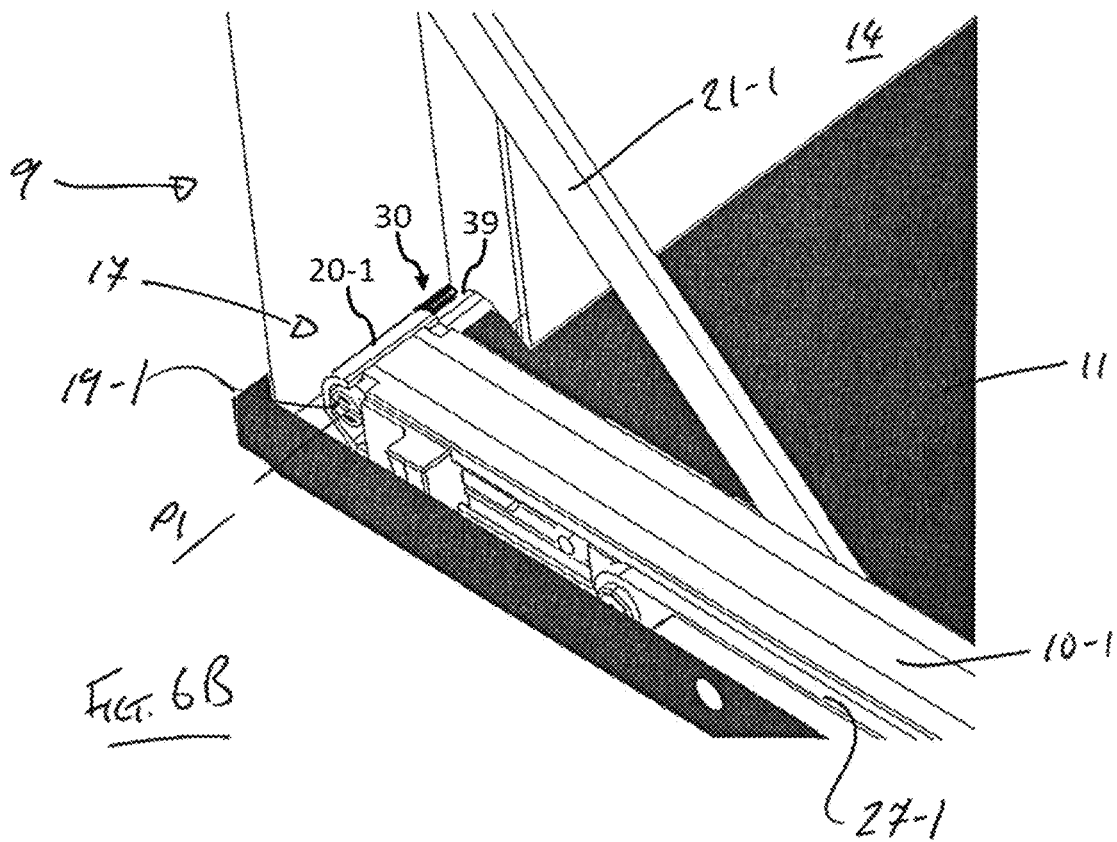

A second embodiment will now be described with reference to FIGS. 6A-D, 7, 8A-C and 9A-C in which the floor panel 9 is pivotally mounted to the base 11 by way of first and second side members 10-1, 10-2. The first pivoting coupling 17 defines the first pivot axis P1. In use, the floor panel 9 pivots relative to the side members 10-1, 10-2 about said first pivot axis P1 when the floor panel 9 is pivoted from said lowered position to said first raised position. The first pivot axis P1 extends in a transverse direction and is located proximal to the front of the floor assembly 2 when the floor panel 9 is in said lowered position. As shown in FIGS. 6A and 6B, the first pivoting coupling 17 in this second embodiment comprises first pivot pins 19-1, 19-2 mounted on opposing sides of the floor panel 9. The first pivot pins 19-1, 19-2 each locate in a first pivot bracket 20-1, 20-2 provided on the respective side member 10-1, 10-2. In this manner, the first pivot pins 19-1, 19-2 and first pivot brackets 20-1, 20-2 provide the first pivoting coupling 17 arranged to pivotably mount the floor panel 9 to the side members 10-1, 10-2.

Figure 6C:
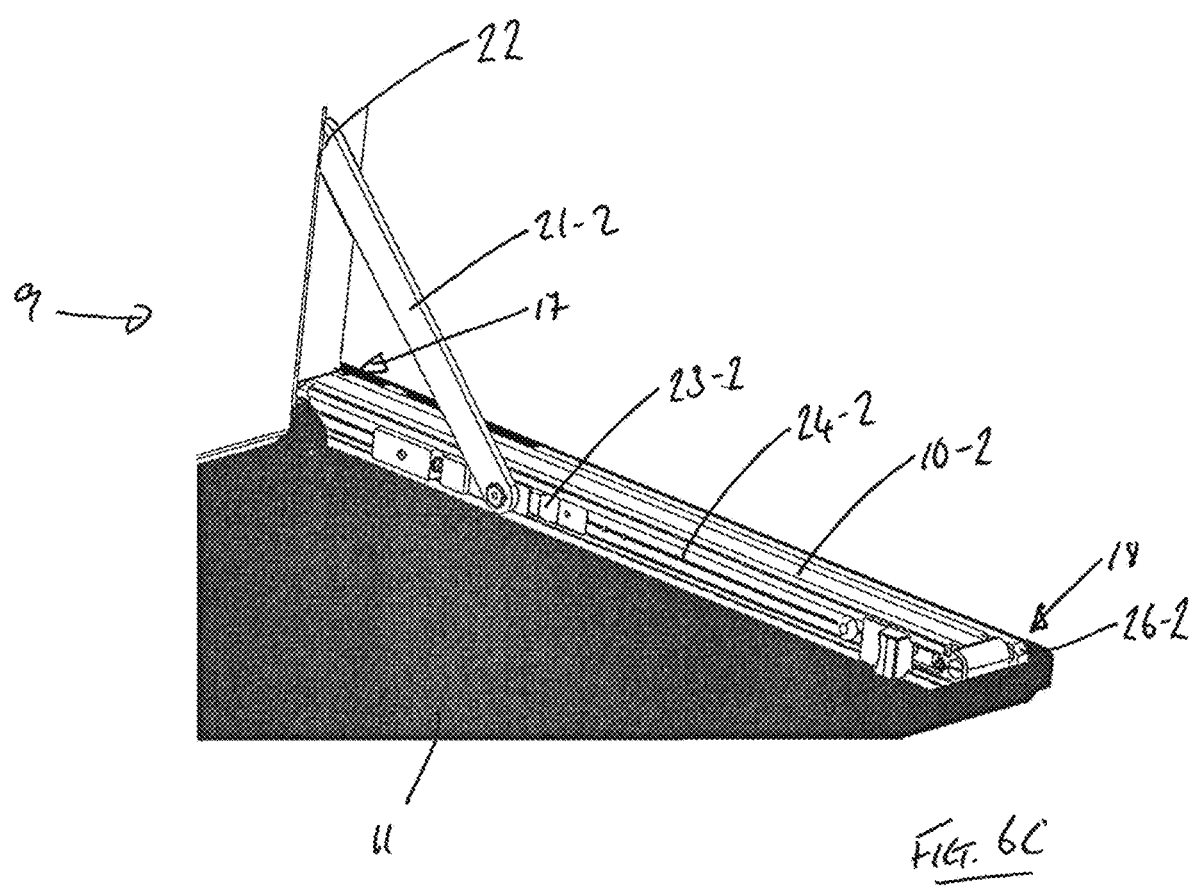

First and second floor panel struts 21-1, 21-2 are provided to support the floor panel 9. The first and second floor panel struts 21-1, 21-2 are pivotally mounted at a first end to fixed pins 22 mounted to an inset section of the lower surface 14 of the floor panel 9. As shown in FIG. 6C, a second end of each of the first and second floor panel struts 21-1, 21-2 is slidably coupled to the respective side member 10-1, 10-2. In particular, the second ends of the first and second floor panel struts 21-1, 21-2 are connected to first and second carriages 23-1, 23-2 arranged to travel along respective first and second guide tracks 24-1, 24-2 provided on the respective side member 10-1, 10-2. The first and second guide tracks 24-1, 24-2 are provided at respective outer facing sides of the side members 10-1, 10-2. The first and second floor panel struts 21-1, 21-2, first and second carriages 23-1, 23-2 and first and second guide tracks 24-1, 24-2 are configured to allow the floor panel 9 to pivot through a predetermined angular range. In the present embodiment, the first and second guide tracks 24-1, 24-2 allow the floor panel 9 to pivot through approximately 90° as it transitions from said lowered position to said first raised position.

The floor assembly 2 may include means for locking or otherwise retaining the floor panel 9 in said first raised position. In the present embodiment, first and second locking mechanisms 35-1, 35-2 are provided on the side members 10-1, 10-2 for selectively engaging the first and second carriages 23-1, 23-2. The first locking mechanism 35-1 is partially shown in FIG. 7; and the second locking mechanism 35-2 is shown in FIG. 6D. The second locking mechanism 35-2 will now be described with reference to FIG. 6D. The second locking mechanism 35-2 comprises an arm 40. The arm 40 is movable axially along the respective side member 10-2 between a passive position and a release position. A knob 38 is provided on the arm 40 for manual operation of the respective locking mechanism 35-2.

The second locking mechanism 35-2 comprises a translation member 41 comprising an inclined surface 42. The translation member 41 is coupled to the arm 40 and arranged to move axially along the second side member 10-2 with the arm 40. The inclined surface 42 of the translation member 41 is inclined with respect to the direction of movement of the translation member 41 along the second side member 10-2. In the illustrated embodiment, the translation member 41 comprises apertures 37. Pins 36 provided on the arm 40 are arranged to be received within the apertures 37 of the translation member 41 to couple the translation member 41 to the arm 40 such that the translation member 41 moves with the arm 40 along the second side member 10-2. The translation member 41 may alternatively form an integral part of the arm 40.

A stop member 43 is mounted on the second side member 10-2 and prevented from axial movement in at least a first direction along the second side member 10-2, whilst permitted at least a range of lateral movement relative to second side member 10-2 (e.g. towards and away from the second side member 10-2). A biasing means (not shown), for example a compression spring, is provided to bias the stop member 43 into a stop position, for example in a direction away from the second side member 10-2. The stop member 43 comprises an engagement feature 44 arranged to engage with the inclined surface 42 of the translation member 41 as the arm 40 moves between the passive and release positions, as described in greater detail below. A biasing means in the form of a compression spring 39 is provided to bias the arm 40 into the passive position.

When the floor panel 9 is raised to said first raised position, the second carriage 23-2 travels along the second guide track 24-2 until it reaches its limit of travel in that first direction, wherein the floor panel 9 is in the first raised position. When the second carriage 23-2 is at said limit of travel, it has passed beyond the stop member 43, and the stop member 43 is biased away from the second side member 10-2 such that it prevents return movement of the second carriage 23-2 back along the second guide track 24-2 in a second direction of travel opposite to said first direction of travel. The floor panel 9 is thereby retained in said first raised position.

To return the floor panel 9 to the lowered position, the arm 40, and thereby the translation member 41, is displaced axially (for example manually using the knob 38) from the passive position to the release position. As the translation member 41 is moved axially with the arm 40, the inclined surface 42 of the translation member 41 engages with the engagement feature 44 of the stop member 43, urging the stop member 43 out of the path of the second carriage 23-2, for example towards the second side member 10-2; thus translating the axial movement of the arm 40 into lateral movement of the stop member 43. When the arm 40 is in the release position, the stop member 43 is urged completely out of the path of the second carriage 23-2 by the inclined surface 42 of the translation member 41, thereby allowing the second carriage 23-2 to travel past the stop member 43 and back along the second guide track 24-2 in the second direction, thereby allowing the floor panel 9 to return to the lowered position.

Other locking mechanisms may be provided to lock the floor panel 9 in said first raised position. A second locking means, for example a mechanical or friction lock, may optionally be provided to lock the longitudinal position of the first and second carriages 23-1, 23-2 in said first and second guide tracks 24-1, 24-2 in one or more intermediate position.

Figure 7:
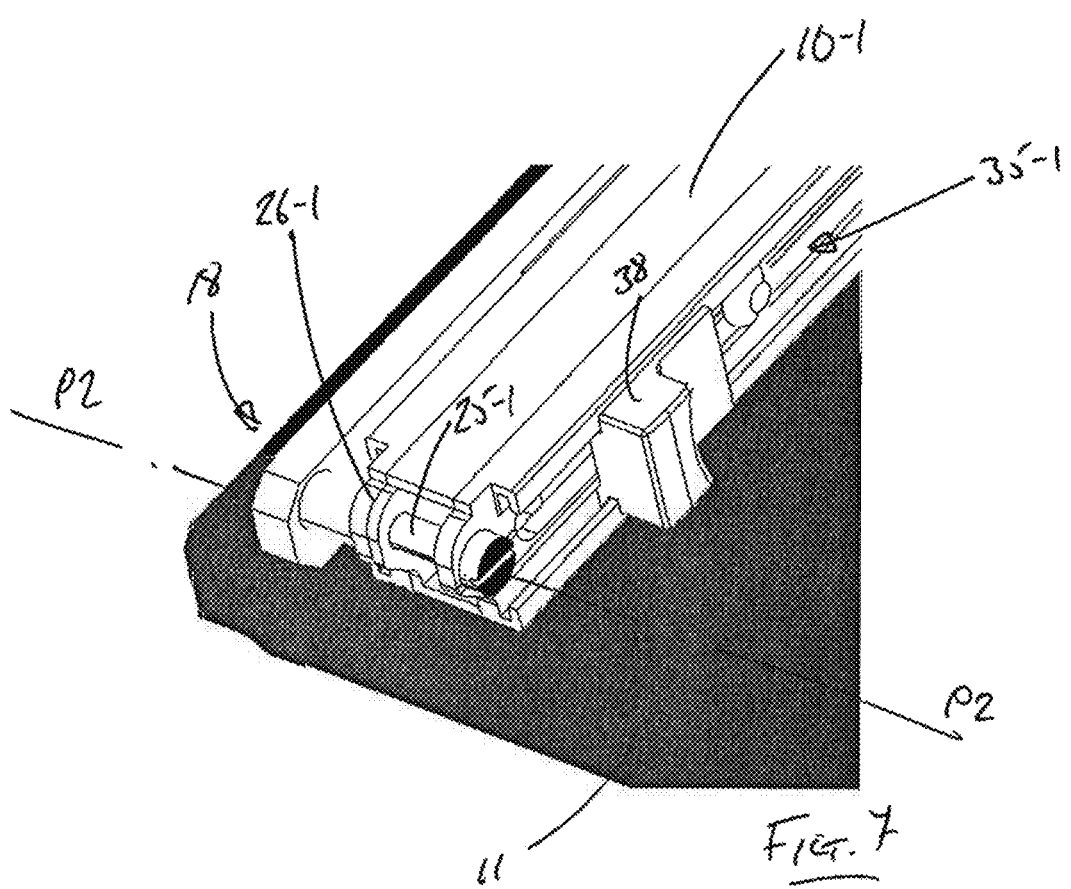
FIG. 7 is a perspective view of the second pivoting coupling for pivoting the floor panel from the lowered position to the second raised position.

The second pivoting coupling 18 defines the second pivot axis P2. In use, the floor panel 9 and the side members 10-1, 10-2 pivot together about said second pivot axis P2 when the floor panel 9 is pivoted from said lowered position to said second raised position. The second pivot axis P2 extends in a transverse direction and is located proximal to the rear of the floor assembly 2 when the floor panel 9 is in said lowered position. As shown in FIGS. 6D and 7, the second pivoting coupling 18 comprises second pivot pins 25-1, 25-2 mounted on opposing side members 10-1, 10-2. The second pivot pins 25-1, 25-2 locate in second pivot brackets 26-1, 26-2 fastened to the base 11. First and second side member struts 27-1, 27-2 (see Figures (are provided to support the side members 10-1, 10-2 when in a raised position. As shown in FIGS. 9B and 9C, a first end of each of the first and second side member struts 27-1, 27-2 is pivotally mounted to the base 11. A second end of each of the first and second side member struts 27-1, 27-2 is slidably coupled to the respective side member 10-1, 10-2. In particular, the first and second side member struts 27-1, 27-2 are connected to third and fourth carriages 28-1, 28-2 (see FIGS. 9B and 9C) arranged to travel in respective third and fourth guide tracks 29-1, 29-2 (see FIGS. 9B and 9C) formed in the sides of the side members 10-1, 10-2. The first and second side member struts 27-1, 27-2, third and fourth carriages and third and fourth guide tracks are configured to allow the side members 10-1, 10-2 and the floor panel 9 to pivot together through a predetermined angular range.

In the present embodiment, the third and fourth guide tracks allow the third and fourth carriages sufficient displacement to permit the floor panel 9 to pivot through an acute angle, as it transitions from said lowered position to said second raised position. The angular movement of the floor panel 9 may be less than 90°, for example approximately 80°, such that a backrest formed by the floor panel 9 when the floor panel 9 is in said second raised position is partially reclined.

The floor assembly 2 may include a retaining mechanism or other means for retaining the floor panel 9 in said second raised position. For example, the locking arrangement described herein to retain the floor panel 9 in said first raised position may be replicated. Locking mechanisms may be provided for selectively locking the third and fourth carriages at a limit of travel in a first direction, wherein the floor panel 9 is in the second raised position. Other locking or retaining means may be used. A second locking or retaining mechanism, for example a mechanical or friction lock, may optionally be provided to lock the longitudinal position of the third and fourth carriages in said third and fourth guide tracks in one or more intermediate position As shown in FIG. 6A, in this illustrated embodiments a clip 30 is mounted to the base 11 for releasably engaging a cooperating feature 39 mounted on the pivot pin 19-2. The clip 30 in the present embodiment comprises a pair of arms 31 for releasably engaging the cooperating feature 39 when the floor panel 9 is in the first raised position. In this manner, the clip 30 and cooperating feature 39 form a retention mechanism arranged to prevent the second pivot pin 19-2, and thus the second side 12-2 of the floor panel 9, from lifting away from the base 11 when the floor panel 9 is in the first raised position. The clip 30 and cooperating feature 39 are further arranged such that, when the floor panel 9 is in the lowered position, the cooperation feature 39 is disengageable from the clip 30. In this manner, the clip 30 and cooperating feature 39 are arranged to permit the second pivot pin 19-2, and thus the second side 12-2 of the floor panel 9, to lift away from the base 11 when the floor panel 9 is moved from the lowered position to the second raised position.

In the illustrated embodiment, the arms 31 of the clip 30 define a receiving feature open at each end to allow the pivot pin 19-2 to pass there through and capable of receiving therein the cooperating feature 39 such that as the floor panel 9 pivots about the first pivot axis P1 between the lowered position and the first raised position, the cooperating feature 39 is able to rotate within the receiving feature formed by the arms 31 of the clip 30. A gap is provided between the arms 31 of the clip 30 such an opening is provided at the top of the receiving feature. The cooperating feature 39 comprises a cross-section profile (e.g. an oval profile) configured to be able to pass through the opening provided at the top of the receiving feature when the floor panel 9 is in the lowered position, but which cross-section profile is too large to pass through the opening provided at the top of the receiving feature when the floor panel 9 is in the first raised position. As illustrated in FIG. 6B, a similar such clip 30 and cooperating feature 39 may also be provided for the pivot pin 19-1.

Figure 8B:
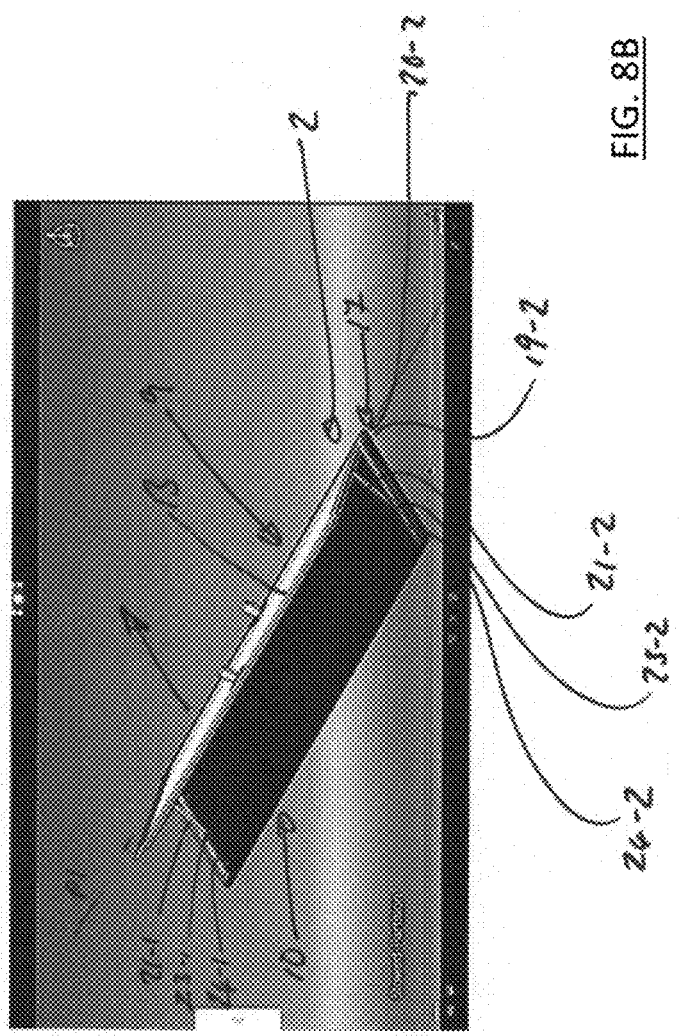
Figure 9A:
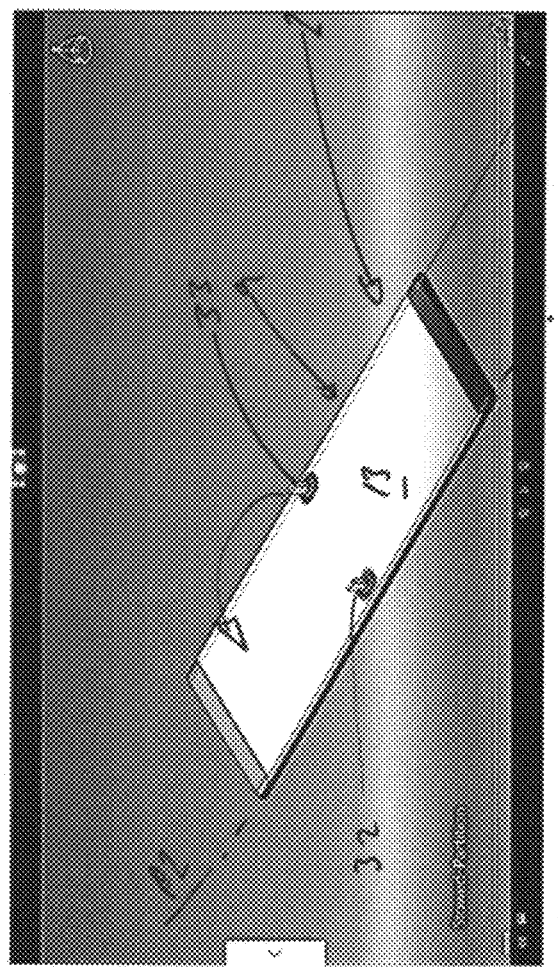
FIGS. 9A, 9B and 9C are perspective views showing the floor panel opening from the lowered position to the second raised position.
Figure 9B:
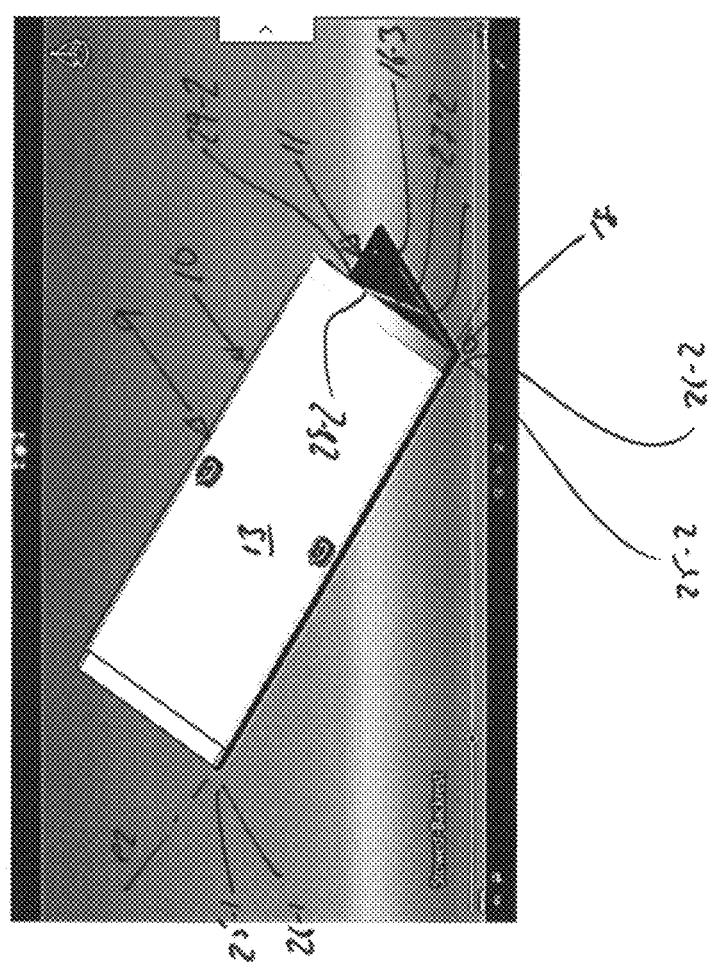
Figure 9C:
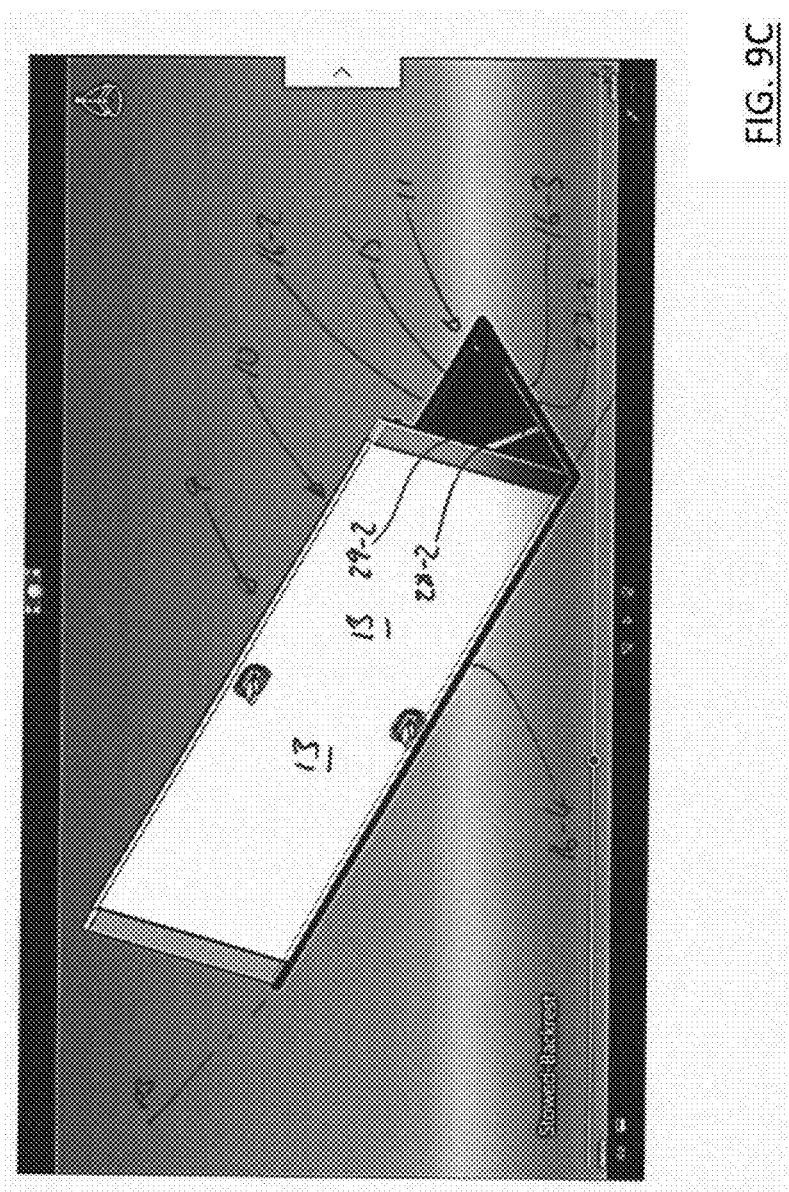

As shown in FIGS. 8A and 9A, the floor panel 9 comprises first and second grips 32, 33 to facilitate pivoting of the floor panel 9 about said first and second pivot axes P1, P2. In the present embodiment the first and second grips 32, 33 comprise loops of webbing, fabric or other flexible material. The first grip 32 is disposed proximal to the fourth side 12-4 of the floor panel 9, i.e. proximal the side closest to the rear of the vehicle 1 when the floor panel 9 is in the lowered position. By lifting the first grip 32, the floor panel 9 pivots about the first pivot axis P1 towards the front of the vehicle 1. The second grip 33 is disposed proximal to the second side 12-2 of the floor panel 9, i.e. closest to the front of the vehicle 1 when the floor panel 9 is in the lowered position. By lifting the second grip 33, the floor panel 9 pivots about the second pivot axis P2 towards the rear of the vehicle 1.

The operation of the floor assembly 2 will now be described. The reconfiguring of the floor panel 9 from the lowered position to the first raised position is illustrated in FIGS. 8A, 8B and 8C. The floor panel 9 is initially in the lowered position, as shown in FIG. 8A, and the upper surface 13 forms a continuation of the floor 4 of the load space 3. The user grips the first grip 32 and applies an upwards force to pivot the floor panel 9 about the first pivot axis P1, as illustrated in FIG. 8B. The first and second floor panel struts 21-1, 21-2 pivot relative to the fixed pins 22 and the first and second carriages 23-1, 23-2 travel along the first and second guide tracks 24-1, 24-2. The floor panel 9 is thereby pivoted to said first raised position, as shown in FIG. 8B8C. In this first raised position the floor panel 9 forms a partition in the load space 3. A user operates the first locking mechanism 35 to release the first and second carriages 23-1, 23-2. The floor panel 9 can then pivot about the first pivot axis P1 to return to the lowered position.

The reconfiguring of the floor panel 9 from the lowered position to the second raised position is illustrated in FIGS. 9A, 9B and 9C. The floor panel 9 is initially in the lowered position, as shown in FIG. 9A, and the upper surface 13 forms a continuation of the floor 4 of the load space 3. The user grips the second grip 33 and applies an upwards force to pivot the floor panel 9 about the second pivot axis P2, as illustrated in FIG. 9B. The first and second side-member struts 27-1, 27-2 pivot relative to the first and third sidewalls 16-1, 16-3 of the base 11 and the third and fourth carriages 28-1, 28-2 travel along the third and fourth guide tracks 29-1, 29-2. The floor panel 9 is thereby pivoted to said second raised position, as shown in FIG. 9B. In this second raised position the floor panel 9 forms a backstop or backrest in the load space 3. A user operates the locking mechanisms to release the third and fourth carriages. The floor panel 9 can then pivot about the second pivot axis P2 to return to the lowered position.

Figure 11A:
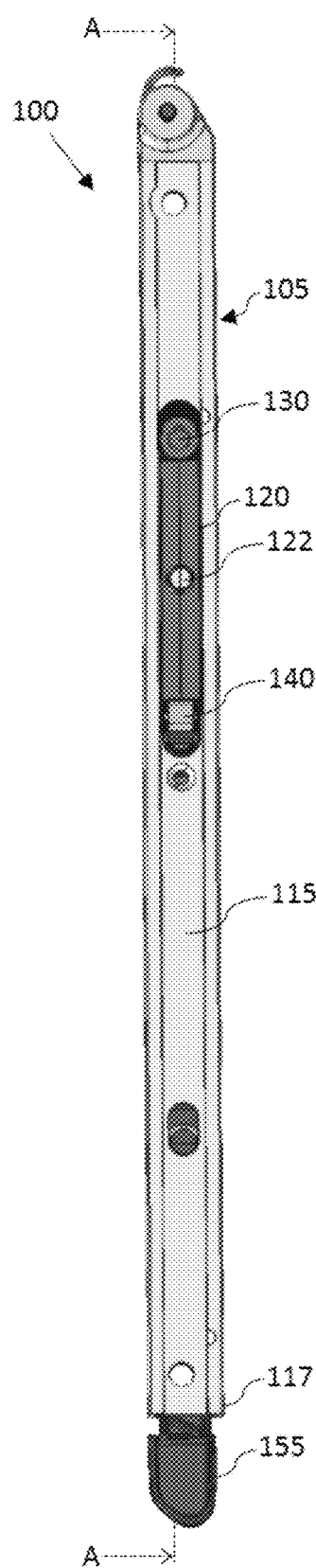
FIG. 11A illustrates a side view of an embodiment of a retaining mechanism for locking or otherwise retaining the floor panel in a raised position.

FIGS. 11A-C, 12 and 13A-B illustrate an alternative embodiment of a retaining mechanism 100 for locking or otherwise retaining the floor panel 9 in a raised position. FIG. 11A illustrates a side view of a guide rail housing 105 within which a locking mechanism 110 of the retaining mechanism 100 is housed. The guide rail housing 105 provides a guide rail 115 within which a carriage 120 is slidably received. The carriage 120 is configured to be attached to a first end of a strut (not shown), a second end of which is pivotably attached to, for example, one of the side-members 10-1, 10-2 or the base 11. In the illustrated embodiment, the carriage 120 comprises a lug 122 to which the strut may be pivotably coupled.

Figure 11B:
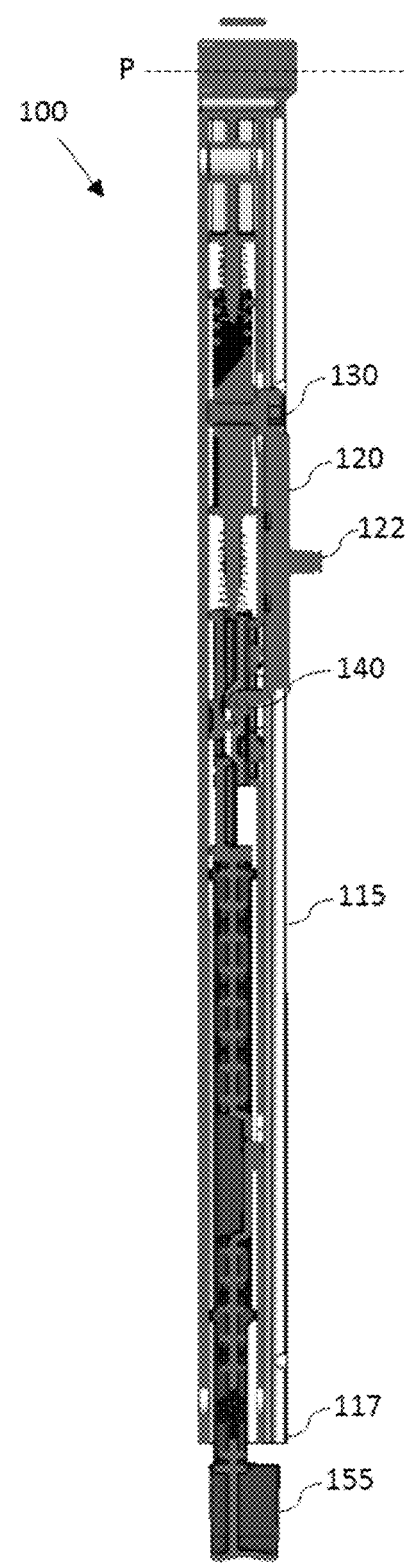
FIG. 11B illustrates a top-down cross-sectional view along the line A:A through the retaining mechanism of FIG. 11A.
Figure 11C:
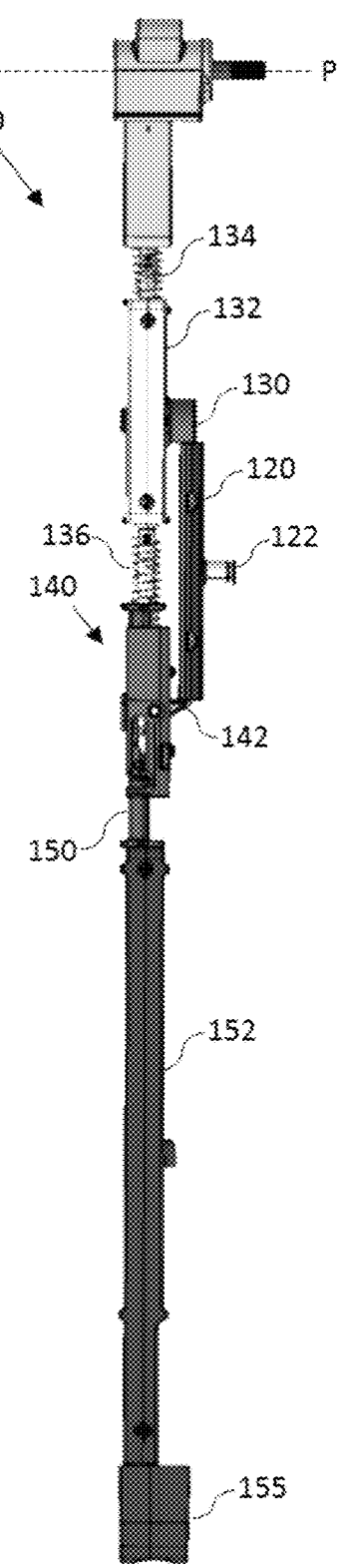
FIG. 11C illustrates a top-down cross-sectional view along the line A:A through a locking mechanism of the retaining mechanism of FIG. 11A.

FIG. 11B illustrates a top-down cross-sectional view through the retaining mechanism 100 along the line A:A in FIG. 11A showing the locking mechanism 110 within the guide rail housing 105, and FIG. 11C illustrates a top-down view of the locking mechanism 110 from the same perspective.

The guide rail housing 105 is configured to be pivotal about an axis P. For example, the guide rail housing 105 may be mounted to an edge of the floor panel 1 and thus arranged to pivot with the floor panel 9 about the first pivot axis P1 between the lowered position and the first raised position. In this case, the second end of the strut (not shown) is pivotably coupled to one of the side members 10-1, 10-2, and as the guide rail housing 105 pivots about the first pivot axis P1 relative to the side member 10-1, 10-2 the carriage slides along the guide rail 115, with the strut (not shown) pivoting at each end thereof. Alternatively, the guide rail housing 105 may be mounted to, or form a part of, one of the side members 10-1, 10-2 and thus arranged to pivot with said side member 10-1, 10-2 about the second pivot axis P2 between the lowered position and the second raised position. In this case, the second end of the strut (not shown) is pivotably coupled to the base 11.

In a latched configuration as illustrated in FIGS. 11A-C, for example when the floor panel is in one of the first or second raised positions, the carriage 120 abuts against a stop element 130 of the locking mechanism 110. The stop element 130 is coupled to a slider 132 which is slidably received within the guide rail housing 105. A first biasing means 134, which in the illustrated embodiment is in the form of a spring element, applies a biasing force to the slider 132 in a direction along the length of the guide rail 115 away from the pivot axis P. In this manner, in the latched configuration the stop member 130 is biased against the carriage 120 and provides a biased stop against which the carriage is held.

Figure 12:
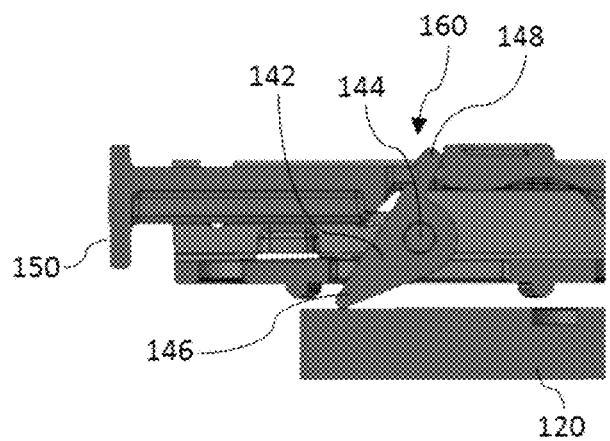
FIG. 12 illustrates a cross-section view of a latching element of the retaining mechanism of FIG. 11A.
Figure 13A:
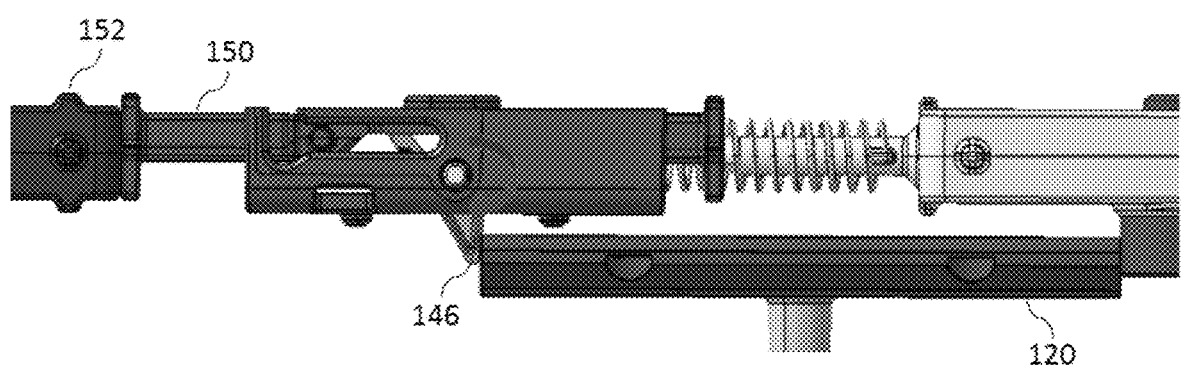
FIG. 13A illustrates a top-down view of a portion of the retaining mechanism of FIG. 11 in a retracted configuration.

A latching mechanism 140 is fixedly received within the guide rail housing 105 and comprises a latch element 142 configured to releasably retain the carriage 120 in abutment with the stop element 130 when in the latched configuration, as illustrated in FIG. 13A. FIG. 12 illustrates a cross-section view of the latching element 142 in greater detail. The latching element 142 is rotatably mounted about an axis 144 and comprises a latching feature 146 configured to releasably engage with the carriage 120 to retain the carriage 120 in abutment with the stop element 130 when in the latched configuration. The latching element 142 further comprises a leg 148 used to control rotation of the latching element 142 about the axis 144.

A second biasing means 136 is configured to apply a biasing force to a first side of the leg 148 of the latching element 142 to bias the latching element 142 in a first rotational direction about the axis 144 such that, in the latched configuration, the latching feature 146 applies a corresponding force to the carriage 120 in a direction along the length of the guide rail 115 towards the stop element 130. In the illustrated embodiment, the second biasing means 136 comprises a further spring element located between the slider 132 and the latching element 142.

A piston 150 is slidably received within the latching mechanism 140 and is configured to engage with a second side of the leg 18 of the latching element 142, opposite the first side of the leg 148 to which the second biasing means 136 applies a biasing force. An arm 152 is slidably received within the guide rail housing 105 along the guide rail housing 105 substantially from the latching mechanism 142 to an end of the guide rail housing 105 distal from the pivot axis P. A first end of the arm 152 extends from the distal end 117 of the guide rail housing 105 and forms a knob 155 operably by a user to release the latching mechanism 140. When the knob 155 is pushed or otherwise urged in a direction along the guide rail housing 105, a second end of the arm 152 proximal the latching mechanism 142 is configured engage with the piston 150 and transfer the force applied to the knob 155 to the piston 150, which in turn transfers said force to the leg 148 of the latching element 142.

In this manner, the knob 155, arm 152 and piston 150 collectively permit a force to be applied to the second side of the leg 148 of the latching element 142 to overcome the biasing force of the second biasing means 136 to cause the latching element to be rotated in a second rotational direction about the axis 144. As the latching element 142 is rotated in the second rotation direction about the axis 144, the latching feature 146 is rotated out of the way of the carriage 120, enabling the carriage 120 to slide along the guide rail 115 away from the stop element 120, and thus out of the latched configuration, as illustrated in FIG. 13B.

Figure 13B:
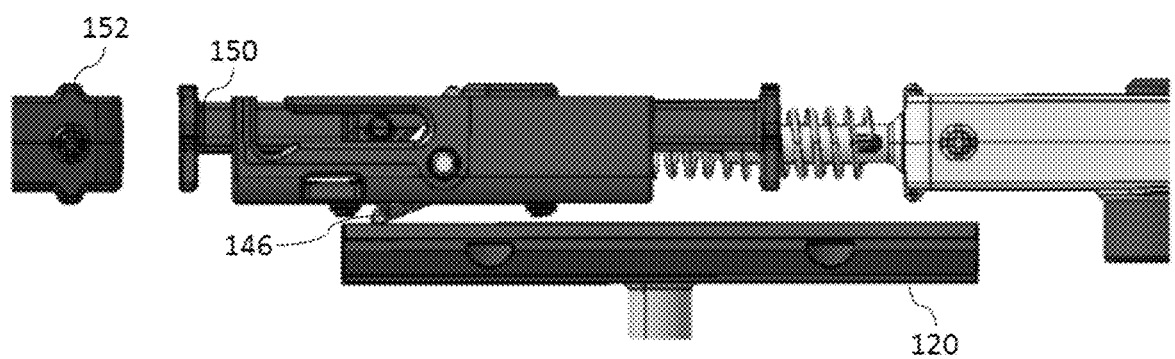
FIG. 13B illustrates a top-down view of a portion of the retaining mechanism of FIG. 11 in a latched configuration.

As also illustrated in FIG. 13B, the arm 152 is separable from the piston 150. In this manner, the piston 150 is able to achieve sufficient movement along the guide rail housing 105 to rotate the latching element 142 between the latched configuration illustrated in FIG. 13B and a retracted configuration illustrated in FIG. 13A, whilst allowing the knob 155 to have a smaller range of movement.

In the illustrated embodiment, a clearance aperture 160 (illustrated in FIG. 12) is provided within the housing of the latching mechanism 140 to permit rotation of the leg 148 of the latching element 142.

It is contemplated that the retaining mechanism 100 as illustrated in FIGS. 11A-C, 12 and 13A-B may be provided on each side of the floor panel 9, for example to retain the floor panel 9 in the first raised position, and on or within each of the side members 10-1, 10-2, for example to retain the floor panel 9 in the second raised position.

Alternatively, it is contemplated that the retaining mechanism 100 as illustrated in FIGS. 11A-C, 12 and 13A-B may be provided on only one side of the floor panel 9, for example to retain the floor panel 9 in the first raised position, and on or within only one of the side members 10-1, 10-2, for example to retain the floor panel 9 in the second raised position.

Alternatively, it is contemplated that the retaining mechanism 100 as illustrated in FIGS. 11A-C, 12 and 13A-B may be provided on each side of the floor panel 9, for example to retain the floor panel 9 in the first raised position as a back rest (thereby reducing the risk of the floor panel accidentally being released by a user leaning against the back rest), whilst on or within only one of the side members 10-1, 10-2, for example to retain the floor panel 9 in the second raised position as a loadspace partition.

It will be understood that various changes and modifications may be made to the floor assembly 2 described herein without departing from the scope of the present invention. For example, the floor assembly 2 may comprise first and second side supports 34-1, 34-2 (shown in FIGS. 3, 4 and 5) for positioning in an upright configuration at respective ends of the floor panel 9 when the floor panel 9 is in said first and second raised positions. When deployed as such, the first and second side supports 34-1, 34-2 are arranged at an angle to the floor panel 9, such that they support the floor panel 9 in the raised or upright configuration. The first and second side supports 34-1, 34-2 may extend substantially perpendicular to the floor panel 9. The first and second side supports 34-1, 34-2 may be used in conjunction with, or instead of the first and second floor panel struts 21-1, 21-2 and/or the first and second side-member struts 27-1, 27-2. The first and second side supports 34-1, 34-2 may, for example, function as supports to retain the floor panel 9 in said first and second raised position. The first and second side supports 34-1, 34-2 may be hingedly connected to the floor panel 9 or may be removably attached thereto.

The floor assembly 2 may optionally also comprise at least one padded member for the floor panel 9. The at least one padded member may comprise a foam member, for example. The at least one padded member may function as backrest padding when the floor panel 9 is in said second raised position. The at least one padded member may, for example, be provided on the upper surface 13 or the lower surface 14 of the floor panel 9. The at least one padded member may be fastened to the floor panel 9. Alternatively, the at least one padded member may be removably mounted.

The base 11 may be arranged to stow the at least one padded member when the floor panel 9 is in said lowered position. For example, the at least one padded member may be stowed below the coupling mechanism 10,10-1,10-2; or between the floor panel 9 and the coupling mechanism 10,10-1,10-2.

It will be appreciated that various modifications may be made to the embodiment(s) described herein without departing from the scope of the appended claims.

The floor assembly 1 has been described herein as comprising a first pivoting coupling 17 arranged to pivotally mount the floor panel 9 to the coupling mechanism 10,10-1,10-2; and a second pivoting coupling 18 to pivotally mount the coupling mechanism 10,10-1,10-2 to the base 11. In a variant, the floor panel 9 the first and second pivoting couplings 16, 17 may both be releasably coupled to the floor panel 9. The first and second pivoting couplings 16, 17 may, for example, each comprise one or more releasable pivoting couplings. In an arrangement of this type, one of said first and second pivoting couplings 16, 17 may be released to enable the floor panel 9 to pivot about the pivot axis X1, X2 defined by the other of said first and second pivoting couplings 16, 17. The coupling mechanism 10, 10-1, 10-2 may be omitted from this arrangement. For example, the first and second pivoting couplings 16, 17 may pivotally couple the floor panel 9 directly to the base 11 or to the floor 4 of the load space 3.

In a modified arrangement, the first and second raised positions could provide fore and aft load space partitions. The longitudinal position of the floor panel in the vehicle in said first and second raised positions could provide alternate partitions in the load space 3.

It will be understood that the floor assembly 2 described herein could be removable from the vehicle. In a further modification the floor assembly 2 could be configured to form a temporary ramp to facilitate ingress to and/or egress from the load space 3 for an animal, such as a dog. The floor assembly 2 may comprise attachment means for attaching one end of the floor assembly 2 to the vehicle 1. The attachment means could, for example comprise a releasable mechanical fastener or coupling mechanism, for attaching the end of the floor assembly to the floor 4 of the load space 3. The other end of the floor assembly may be positioned on the ground behind the vehicle 1 to form an inclined ramp.

The invention claimed is:

1. A floor assembly for a vehicle load space, the floor assembly comprising:
   a floor panel configurable in a lowered position, a first raised position and a second raised position;
   a first pivot defining a first pivot axis about which the floor panel pivots from the lowered position to said first raised position;
   a second pivot defining a second pivot axis about which the floor panel pivots from the lowered position to said second raised position; and
   a locking mechanism for locking the floor panel in at least one of the first raised position and the second raised position.

2. A floor assembly as claimed in claim 1, wherein the locking mechanism is configured to lock the floor panel in at least one of:
   one or more intermediate positions between the lowered position and the first raised position; and
   one or more intermediate positions between the lowered position and the second raised position.

3. A floor assembly as claimed in claim 1, wherein said first and second pivot axes are arranged substantially parallel to each other.

4. A floor assembly as claimed in claim 1, wherein the floor panel comprises a plurality of sides, the first and second pivot axes being disposed along opposing sides of the floor panel.

5. A floor assembly as claimed in claim 1 comprising a coupling mechanism; wherein the first pivot is configured to pivotably mount the floor panel to said coupling mechanism.

6. A floor assembly as claimed in claim 5 comprising at least one floor panel strut for supporting the floor panel.

7. A floor assembly as claimed in claim 6, wherein the locking mechanism engages the at least one floor panel strut to retain the floor panel in said first raised position.

8. A floor assembly as claimed in claim 5, wherein the second pivot is configured to pivotably mount the coupling mechanism such that the floor panel and the coupling mechanism pivot together about said second pivot axis.

9. A floor assembly as claimed in claim 8 comprising at least one side-member strut for supporting the coupling mechanism.

10. A floor assembly as claimed in claim 9, wherein the locking mechanism engages the at least one side-member strut to lock the floor panel in said second raised position.

11. A floor assembly as claimed in claim 5, comprising a base for mounting to a floor of the vehicle load space, wherein the base comprises a recess for receiving said coupling mechanism.

12. A floor assembly as claimed in claim 11, comprising a retention mechanism arranged to prevent a side of the floor panel along which the first pivot axis is disposed from lifting away from the base when the floor panel is in the first raised position.

13. A floor assembly as claimed in claim 1, wherein one of said first and second raised positions is a load space partitioning position and the other of said first and second raised positions is a backstop or backrest position.

14. A floor assembly as claimed in claim 1, comprising first and second side supports for positioning in an upright configuration at respective ends of the floor panel when the floor panel is in at least one of said first raised position and said second raised position.

15. A vehicle comprising the floor assembly as claimed in claim 1.

16. A vehicle as claimed in claim 15, wherein the floor assembly is disposed in the vehicle load space.

17. A vehicle as claimed in claim 16, comprising a tailgate and wherein the floor panel is configured to form a backrest for at least one person sitting on a floor of the load space or on the tailgate which is opened to provide access to the load space.

18. A vehicle as claimed in claim 15, wherein the floor assembly is configured such that said first and second pivot axes extend in a transverse direction.

19. A floor assembly for a vehicle load space, the floor assembly comprising:
- a floor panel configurable in a lowered position, a first raised position and a second raised position;
- a base for mounting the floor assembly to a floor of the vehicle load space;
- a first pivot axis about which the floor panel pivots relative to the base from the lowered position to the first raised position;
- a second pivot axis about which the floor panel pivots relative to the base from the lowered position to the second raised position; and
- a locking mechanism for locking the floor panel in at least one of the first raised position and the second raised position.

20. A floor assembly for a vehicle load space as claimed in claim 19, comprising a support structure and
- wherein a pivotal coupling between the floor panel and the support structure defines the first pivot axis; and
- wherein a pivotal coupling between the support structure and the base define the second pivot axis.

* * * * *